US011863613B1

(12) United States Patent
Sathe et al.

(10) Patent No.: US 11,863,613 B1
(45) Date of Patent: Jan. 2, 2024

(54) ALLOCATION OF WORKLOADS IN DYNAMIC WORKER FLEET

(71) Applicant: Amazon Technologies, Inc., Seattle, WA (US)

(72) Inventors: Mihir Sathe, Seattle, WA (US); Aravind Srinivasan, Ellicott City, MD (US); Pranav Rao Perampalli Nekkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 17/209,008

(22) Filed: Mar. 22, 2021

(51) Int. Cl.
*H04L 67/1008* (2022.01)

(52) U.S. Cl.
CPC .................. *H04L 67/1008* (2013.01)

(58) Field of Classification Search
CPC ........... H04L 67/1008; H04L 29/08144; H04L 2012/5678; H04L 2012/568; H04L 47/125; H04L 29/08158; H04L 29/08243; H04L 29/0827; H04L 67/1002; H04L 67/1029; H04L 67/1031; H04L 47/726; H04L 67/1004; H04W 28/08; H04N 21/23103; G06F 9/5083
See application file for complete search history.

(56) References Cited

U.S. PATENT DOCUMENTS

| 9,450,876 | B1 * | 9/2016 | Marr | H04L 47/125 |
| 10,055,262 | B1 * | 8/2018 | Thomas | G06F 9/5083 |
| 2002/0120761 | A1 * | 8/2002 | Berg | H04L 69/163 |
| | | | | 709/230 |
| 2005/0249199 | A1 * | 11/2005 | Albert | H04L 67/1008 |
| | | | | 370/352 |
| 2006/0106938 | A1 * | 5/2006 | Dini | H04L 67/101 |
| | | | | 709/227 |
| 2008/0267083 | A1 * | 10/2008 | MacCormick | H04L 43/04 |
| | | | | 370/252 |
| 2009/0007101 | A1 * | 1/2009 | Azar | G06F 9/5077 |
| | | | | 718/1 |
| 2010/0274893 | A1 * | 10/2010 | Abdelal | H04L 47/263 |
| | | | | 709/224 |
| 2015/0006630 | A1 * | 1/2015 | Thomas | H04L 67/1008 |
| | | | | 709/203 |
| 2015/0249579 | A1 * | 9/2015 | Ellsworth | H04L 67/125 |
| | | | | 709/221 |

(Continued)

OTHER PUBLICATIONS

Geravand, et al., Bloom Filter Applications in Network Security: A State-of-the-Art Survey, Computer Networks (2013), doi: http://dx.doi.org/10.1016/j.comnet.2013.09.003.

*Primary Examiner* — Michael Won
(74) *Attorney, Agent, or Firm* — Knobbe, Martens, Olson & Bear, LLP

(57) ABSTRACT

Systems and methods are described for allocating requests to implement new workloads within a dynamic set of servers. Existing load balancing techniques can result in "focus firing" on new servers added to the set, since a load balancer may view a new server as underloaded. With sufficient intensity, focus firing can result in overshooting target load for the new server, and the new server in fact becoming overloaded. The present disclosure modifies selection of servers as potential targets for a workload by at least partly biasing against selection of young servers. The bias imposed can be scaled to avoid overloading new servers.

21 Claims, 5 Drawing Sheets

(56) References Cited

U.S. PATENT DOCUMENTS

| | | | |
|---|---|---|---|
| 2017/0126500 A1* | 5/2017 | Eggen | H04L 41/40 |
| 2017/0149877 A1* | 5/2017 | Kabbani | H04L 45/7453 |
| 2018/0006903 A1* | 1/2018 | Ganguli | H04L 41/5019 |
| 2018/0007162 A1* | 1/2018 | Olmsted-Thompson | H04L 67/59 |
| 2018/0331973 A1* | 11/2018 | Mani | G06F 8/65 |
| 2019/0042126 A1* | 2/2019 | Sen | G06F 9/4494 |
| 2019/0260204 A1* | 8/2019 | Koval | G06Q 30/0206 |
| 2020/0012753 A1* | 1/2020 | Yokoyama | G06F 30/20 |
| 2020/0233844 A1* | 7/2020 | Kessel | G06F 16/906 |
| 2020/0333767 A1* | 10/2020 | Engelstein | H04Q 9/00 |
| 2020/0336370 A1* | 10/2020 | Hong | H04L 67/1001 |

\* cited by examiner

ALLOCATION OF WORKLOADS IN DYNAMIC WORKER FLEET

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

The workloads supported in data centers, such as execution of processes on virtual machine resources, vary in their utilization of computing resources. It is typically desirable to ensure that a given computing device is not allocated more workloads than resources of the device can support. Accordingly, many data centers include load balancers configured to route workloads to an appropriate device. Often, it is desirable to route workloads as quickly as possible, to avoid delaying the workload. Moreover, load on a device may stem from operation of multiple different load balancers. As a result, it is often impossible or impractical for an individual load balancer to have perfect knowledge of the state of each device, and routing must occur based on imperfect knowledge of that state.

DETAILED DESCRIPTION

Generally described, aspects of the present disclosure relate to routing workloads among. a fleet of servers configured to support such workloads, in a manner that increases the efficiency of the fleet by reducing the propensity for underloaded servers to be "focus fired" on during routing, which may otherwise lead to a previously underloaded server becoming quickly overloaded. As disclosed herein, each server within a fleet may have a target use level, such as 80% of resources, 90% of resources, 95% of resources, etc. A set of load balancer may be configured to route workloads based at least in part on that work level, such as by randomly selecting k servers and routing a workload to a least loaded among the k servers. In environments where a sufficiently high number of workloads are routed concurrently, this selection mechanism can lead to "focus firing," in which multiple load balancers each identify an individual underloaded server as the routing target for various workloads. These workloads can then arrive simultaneously (or substantially simultaneously) at the individual server, causing the server to become overloaded. This overloading can lead to errors or delays on the server, and in some cases cause workloads to fail. This scenario is particularly prevalent in instances where servers are added to a fleet, such as during "scale up" of a fleet to handle increasing load or during periodic rotation of servers, since these newly-added servers typically begin with low or no workload. After a sufficient period within the fleet, focus firing may be avoided via general operation of load balancers, since that general operation is intended to result in relatively even load among the servers that typically prevents an individual server from being so underloaded as to cause focus firing to occur. It is therefore desirable to enable each load balancer to route workloads to target servers, while avoiding this focus firing effect for newly-added servers. Embodiments of the present disclosure provide for this result, by modifying a selection algorithm of load balancers to bias against selection of newly added servers, with the bias against selection being based at least partly on an age of the server. As a result, the propensity for focus firing on newly added servers is reduced, and these servers can instead be gradually brought to a target use level without overloading the servers.

Figure 1:
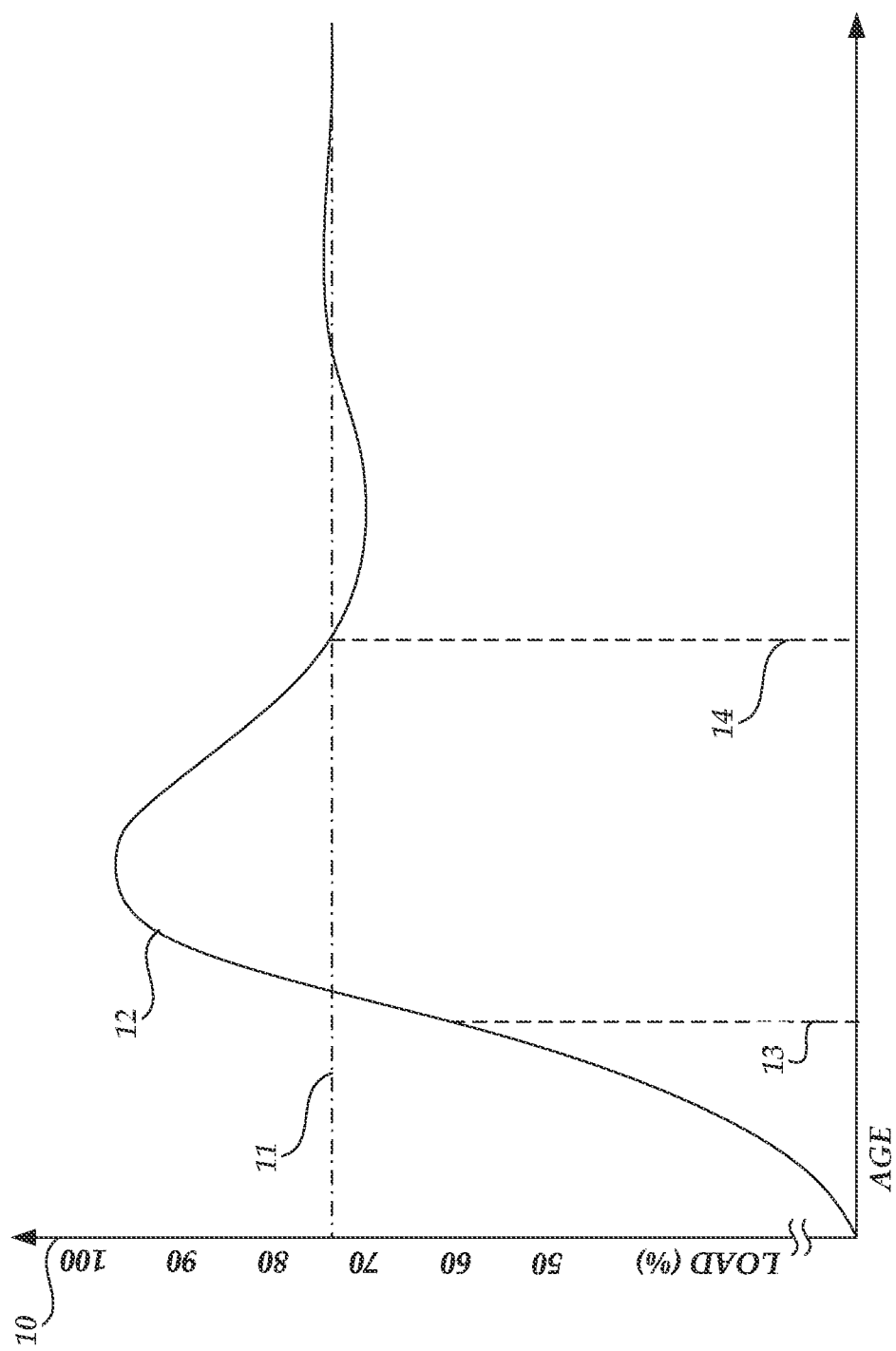
FIG. 1 shows a set of illustrative visualizations of load on a server over time, including overloading of the server due to focus firing.

One potential example of problematic focus firing is shown in FIG. 1, where graph 10 plots the load on a server (e.g., as a function of use of one or more computing resources, such as processing time or memory) relative to age of the server. In FIG. 1, it is assumed that one or more load balancers are configured to route workloads among a set of servers based at least partly on relative load, such that a less loaded server is preferred relative to a more loaded server. This may involve, for example, selection of a least loaded server among a sample of servers (e.g., selected at random). It is further assumed in FIG. 1 that among the set of servers, ages are distributed substantially evenly. For example, servers may have a lifetime l, such that after time l has elapsed, the server is taken offline and a new server is introduced into the set. Servers may be rotated within the period l, such that for example 10% of servers are rotated for each tenth of the time period l. In this scenario, graph 10 shows the load of a server as a function of age in a focus firing scenario. Load illustratively represents usage of one or more computing resources, such as various types of processor utilization (e.g., CPU use, graphical processor unit (GPU) use, tensor processor unit (TPU) use, etc.), various types of memory use (e.g., RAM, persistent memory such as disk drives or solid state drives, etc.), various types of bandwidth (e.g., of a network or other communication bus), or various types of programmatic resources (e.g., threads, memory slots, etc.) which themselves correspond to usage of processor time, memory, or bandwidth.

Specifically, in graph 10 a server at age 0 has 0 load, and load 12 is then increased over time as the load balancers preferentially select the server as a target for new workloads. The target total load on the server is shown as line 11. Thus, it may generally be desirable to route new workloads to the server so long as load 12 is less than target total load 11. At a given age, such as that shown by line 13, the server may still have a relatively low load 12 relative to the target total load 11, and load balancers may continue to route new workloads to the server.

However, the workloads routed based on the measured load at age 13 illustratively result in the load 12 exceeding the target total load 11, and potentially exceeding the total resources available at the server, which may result in errors. The load balancers can then halt distribution of new workloads to the server, until a relative equilibrium is reached around line 14, such that load 12 is substantially equal to the target total load 11.

Load 12 exceeding target total load 11 can occur for a number of reasons. For example, multiple load balancers may simultaneously route new workloads to the server at a time equal to age 13, resulting in the load 12 exceeding the target total load 11. As another example, there may be a delay in a load balancer obtaining information as to the load 12 on the server, such that it appears to the load balancer that load 12 is below the target total load 11 even when load 12 has met or exceeded that target total load 11. In either scenario, it can be seen that the intensity of focus firing is generally a function of a speed of new workloads being routed to the set of servers. Thus, this issue can be particularly prevalent where the volume of new workloads being routed is high.

Some potential solutions to the problem of focus firing may include increasing coordination among load balancers and/or increasing the fidelity of load information at each load balancer. For example, a system may be configured such that each new workload is routed to a server only after up-to-date load information for the server is obtained, such as by querying the server for load information prior to making a routing decision. This may avoid, for example, a single load balancer focus firing on a server due to a delay in load information. Similarly, a system may be configured such each load balancer confers with other load balancers prior to making a routing decision, such that multiple load balancers do not simultaneously route loads to a server that would result in focus firing. While these solutions may be possible, they also detrimentally affect routing by increasing the latency and complexity of that routing. For example, where up-to-date load information is required to route each workload, each load balancer would introduce multiple network communications into each routing decision by querying each potential server for load information. Similarly, where load balancers act in coordination, multiple network communications between load balancers would be required. These communications increase computational costs and delay routing, which may be detrimental to operation of a load balancer and a computing system overall.

Another potential solution to the problem of focus firing may be to modify a load balancing algorithm used to distribute load among servers. For example, using a "best of k" selection approach, the size of k may be reduced, reducing the likelihood that a young server is included within a set of k servers. While this approach may result in less focus firing on younger servers, it may also increase the time required for a younger server to reach a desired load. Moreover, it may undesirably reduce the efficacy of the load balancing among all servers. Thus, it may be preferable to establish a load balancing algorithm that limits load among younger servers in a controllable fashion, so that such younger servers can be quickly brought to a desired load level without negatively impacting general load balancing and while avoiding the issues noted above.

Embodiments of the present disclosure provide a solution to the problem of focus firing by providing for routing logic that can be independently applied at each load balancer, and which biases selection of a target server based at least partly on the age of the server, such that a lower aged server is selected less often as a candidate for routing than a higher aged server. Specifically, algorithms are disclosed herein that utilize a probability density function (PDF) based at least partly on an age of a server to bias selection of a sample set of servers as candidates to which to route a load. The load may then be routed to a server selected from the sample set according to a variety of factors, such as a least loaded server. Because the PDF used to select the sample set can be biased against selection of younger servers, the total load placed on those servers can be controlled, reducing or eliminating problematic focus firing without substantially increasing time or resources required to route workloads.

The routing mechanisms disclosed herein may be applicable to a wide variety of computing systems. Due to the speed and efficiency of such routing decisions, the presently disclosed techniques may be particularly suitable for environments desiring low latency routing decisions, such as on-demand code execution systems. Generally described, an on-demand code execution system enables rapid execution of source code, which may be supplied by users of the on-demand code execution system. For example, a user may submit a script in a specific programming language (e.g., the PYTHON' language) that, when executed, implements network-based processing for a user-facing application (e.g., a mobile device "app"). The on-demand code execution system can then enable the user to submit "calls" to execute that script, at which point the system will securely execute the script to provide the desired functionality. Unlike some other network-based services, an on-demand code execution system can remove the need for a user to maintain or configure a computing device, either virtual or physical, to support code execution. Due to this lack of need for a user to maintain a device, on-demand code execution systems are sometimes referred to as "serverless" systems (though of course the on-demand code execution system itself, as opposed to individual users, may maintain servers to support code execution).

To facilitate rapid on-demand code execution, the system can maintain a variety of execution environments (e.g., virtual machine instances, software containers, etc.) pre-provisioned with software, such as an operating system, code libraries and the like, used during execution of code. Each environment may be provided with access to resources of a host computing device hosting the environment. For example, each environment may be associated with a specific amount of random access memory ("RAM") (e.g., n gigabytes), a specific amount of disk storage, a specific amount of central processing unit ("CPU") time (e.g., milliseconds per second of a host CPU), etc. Because each code execution is unlikely to utilize all resources allocated to its environment, the on-demand code execution system can increase efficiency by "over-subscribing" host resources, such that new environments are added to a host until resource usage of the host exceeds a given level (e.g., 90% used). This technique minimizes the number of resources needed to support the on-demand code execution system.

When a request to execute code is obtained at the on-demand code execution system, a routing device can generally attempt to route the request to a pre-existing environment, if such an environment exists and is not current handling a distinct request to execute code. When no such environment exists (or when all such environments are handling other requests to execute code), the device may attempt to generate a new environment on a host computing device (e.g., a server). This generation of a new environment can represent a request to initialize a workload on a server, and can thus be routed according to embodiments of the present disclosure. Notably, the issue of focus firing may be particularly prevalent on on-demand code execution systems, as routing of a workload may occur before resources are consumed by that workload. Thus, it may be difficult or impossible for even a single load balancer to accurately determine how much eventual load will occur on a target server due to the workloads already routed to that server.

Figure 2:
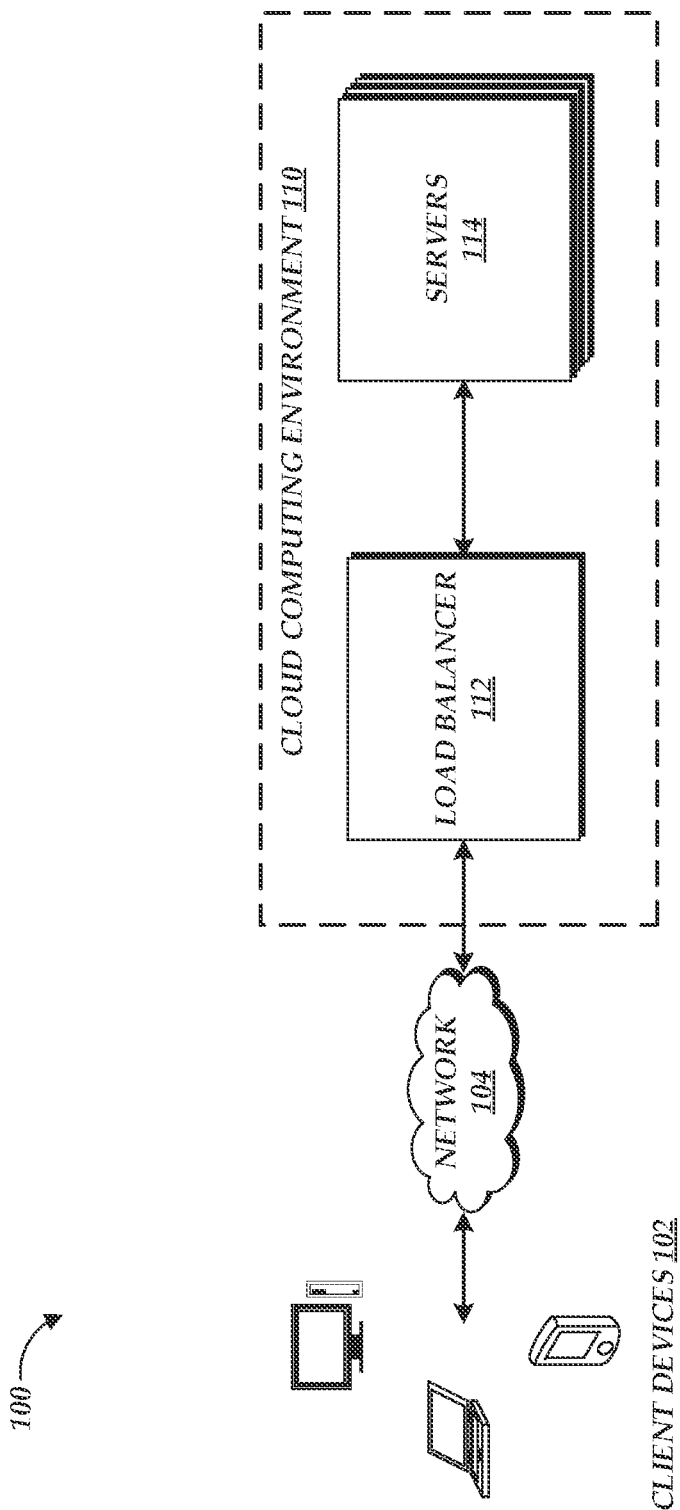
FIG. 2 is block diagram depicting an illustrative environment in which a cloud computing environment can operate to distribute workloads among servers of according to embodiments of the present disclosure, in a manner that reduces or eliminates focus firing.

FIG. 2 is a block diagram of an illustrative operating environment 100 in which a cloud computing environment 110 may operate to provide a network-accessible service (e.g., an on-demand code execution service) to client devices 102, and to route requests to initiate workloads on the service in accordance with embodiments of the present disclosure. By way of illustration, various example client computing devices 102 are shown in communication with the cloud computing environment 110, including a desktop computer, laptop, and a mobile phone. While shown in FIG. 2 as end user devices, client computing devices 102 can be any computing device, including end user computing devices such as a desktops, laptops or tablet computers, personal computers, wearable computers, personal digital assistants (PDAs), hybrid PDAs/mobile phones, mobile phones, electronic book readers, set-top boxes, voice command devices, cameras, digital media players, and the like, as well as non-user devices, such as servers that themselves provide network-accessible services to end user devices.

A cloud computing environment (sometimes referred to simply as a "cloud"), such as the environment 110 of FIG. 2, refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud computing environment 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud computing environment 110 can provide a variety of services to client devices 102, such as compute services (e.g., services enabling creation of on-demand processing power) and a block storage services (e.g., services enabling creation of on-demand block storage devices). Some implementations of the cloud computing environment 110 can additionally include domain name services ("DNS") services, object storage services, relational database services, and other service configurations for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via client devices 102, to access and configure resources provided by the various services.

The cloud computing environment 110 can provide on-demand, scalable computing platforms to users through the network 104, for example allowing users to have at their disposal scalable "virtual computing devices" via their use of a compute service and block storage service. These virtual computing devices have attributes of a personal computing device including hardware (various types of processors, local memory, random access memory ("RAM"), and hard-disk and/or SSD storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud computing environment 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers) and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud computing environment 110 may deliver content from points of presence outside of, but networked with, these regions by way of edge locations and regional edge cache servers. This compartmentalization and geographic distribution of computing hardware enables the cloud computing environment 110 to provide low-latency resource access to customers on a global scale with a high degree of fault tolerance and stability.

As illustrated in FIG. 2, the cloud provider network 110 can communicate over network 104 with client devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

In FIG. 2, the environment 110 includes a set of servers 114 configured to provide a network-accessible service. The techniques described herein are widely applicable to a variety of services, and as such, the particular service provided by servers 114 is not described in detail herein. However, each server 114 illustratively corresponds to a computing device—virtual or physical—configured with executable instructions to provide the service to client devices 102. The servers 114 may illustratively be created by interaction between a user and the cloud computing environment 110, such as to provision compute resources of the environment 110 to provide the servers 114.

In addition, the environment 110 includes a load balancer 112 configured to distribute requests for the service from client devices 102 to individual servers 114. The load balancer 112 may be a dedicated load balancing computing device or a general purpose computing device configured to provide load balancing functionality. The load balancer 112 may be a physical device, or a virtual device implemented on physical hardware of the environment 110. In FIG. 2, the load balancer 112 is shown as interposed between the client devices 102 and servers 114, representing that request from client devices 102 are first passed to the load balancer 112 before being passed to the servers 114. In some instances, this arrangement may be physical: the servers 114 may be physically linked to the load balancer 112, such the servers 114 are accessible from the network 104 only through the load balancer 112. In other instances, this arrangement may be logical, such that requests for the service are routed by the environment 110 the load balancer 112, which subsequently forwards or redirects the requests to the servers 114. For example, in the case of a serverless computing system, a frontend may obtain a request to initiate a workload, and may interact with the load balancer 112 to request a server 114 onto which to place the workload. The load balancer 112 may route the request to an appropriate server 114, or may select the server 114 and return identifying information of the server 114 to the frontend, which may in turn route the request to the server 114.

The load balancer 112 can illustratively maintain information regarding the set of servers 114, to enable distribution of requests to the servers 114. For example, the load balancer 112 may maintain a record of individual servers within the servers 114, such that new servers may be added, or old servers removed, from the set of servers 114 (e.g., via operation of the cloud computing environment 110 to rapidly create or destroy servers 114). The load balancer 112 may further maintain load or health information for individual servers. Such information may include, for example, a number of requests serviced by a server 114 in a given time frame, computational resource usage or availability of an individual server 114, response time metrics of a server 114, error counts for an individual server 114, etc. In accordance with embodiments of the present disclosure, this information may further include ages of individual servers 114, such as a length of time since the server 114 was initialized or the time of that initialization. In some embodiments, each server 114 may have a given lifespan, and the age of a server may be characterized in some cases as a percentage of that lifespan (e.g., 10% into its lifespan, 20% into its lifespan, etc.). The ages of servers 114 may be modeled as an appropriate distribution, according to the mechanism used for retiring old servers and introducing new servers. For example, servers 114 may have a substantially equal distribution of ages, such that a randomly selected server 114 is equally likely to be any age with respect to the lifespan.

In some instances, the load balancer 112 may information as to servers 114 directly, such as by periodically communicating with each server 114 to gather the information. In other instances, the environment 110 may include additional monitoring or health checking devices (not shown in FIG. 2) that collect this information and make it available to the load balancer 112.

In example embodiments, the load balancer 112 can route requests to servers 114 based on a "best of k" algorithm, whereby, for each requested workload the load balancer 112 selects at random, according to a distribution, a candidate set of k servers 114, and then routes the workload to a "best" server 114 of those k servers 114. The "best" server 114 may be selected according to a number of objective functions, such as the least loaded server 114 of the set k in terms of one or more computing resources. For example, the "best" server 114 may be selected as a least loaded server 114 in terms of current random access memory (RAM) use. In accordance with embodiments of the present disclosure, the distribution used to select the candidate set k may be biased against selection of younger servers 114, such that younger servers 114 are less likely to be included within a set k, and thus less likely to be subject to focus firing.

While a single load balancer is shown in FIG. 2, embodiments of the present disclosure may include multiple load balancers 112 that themselves act as a distributed service. Each load balancer 112 can implement the techniques described herein in order to gain the advantages of these techniques. In some instances, these techniques may be implemented with little or no synchronization of information or coordination between load balancers 112, other than implementing the same techniques. For example, each load balancer 112 may obtain state information for servers 114 from a centralized location (e.g., a health monitoring service for the servers 114), and make routing decisions based on that state information, without requiring communications between balancers 112 when making such decisions.

While FIG. 2 depicts a simplified environment 110, environments in practice may contain more or different components than shown in FIG. 2. For example, an environment in practice may include one or more "frontends" that directly obtain request from client devices 102, and that pass such request to the load balancer 112 when necessary (e.g., where a server 114 is not already assigned to handle the request). Thus, the configuration of FIG. 2 is illustrative in nature.

As will be appreciated by one of skill in the art in light of the present disclosure, the embodiments disclosed herein improves the ability of computing systems, such as cloud computing environments, to efficiently allocate computing resources, enabling load to be distributed among different devices while reducing occurrences of focus firing that might otherwise result in overloading or errors. Moreover, the presently disclosed embodiments address technical problems inherent within computing systems; specifically, the limited nature of computing resources in handling various loads, the variety of workloads handled by computing systems, and the inherent complexities in allocating resources among devices of such systems. These technical problems are addressed by the various technical solutions described herein, including the use of a load balancer that routes requests according to a distribution biased against selection of younger devices, to avoid overloading younger devices. Thus, the present disclosure represents an improvement in cloud computing environments and computing systems in general.

Figure 3:
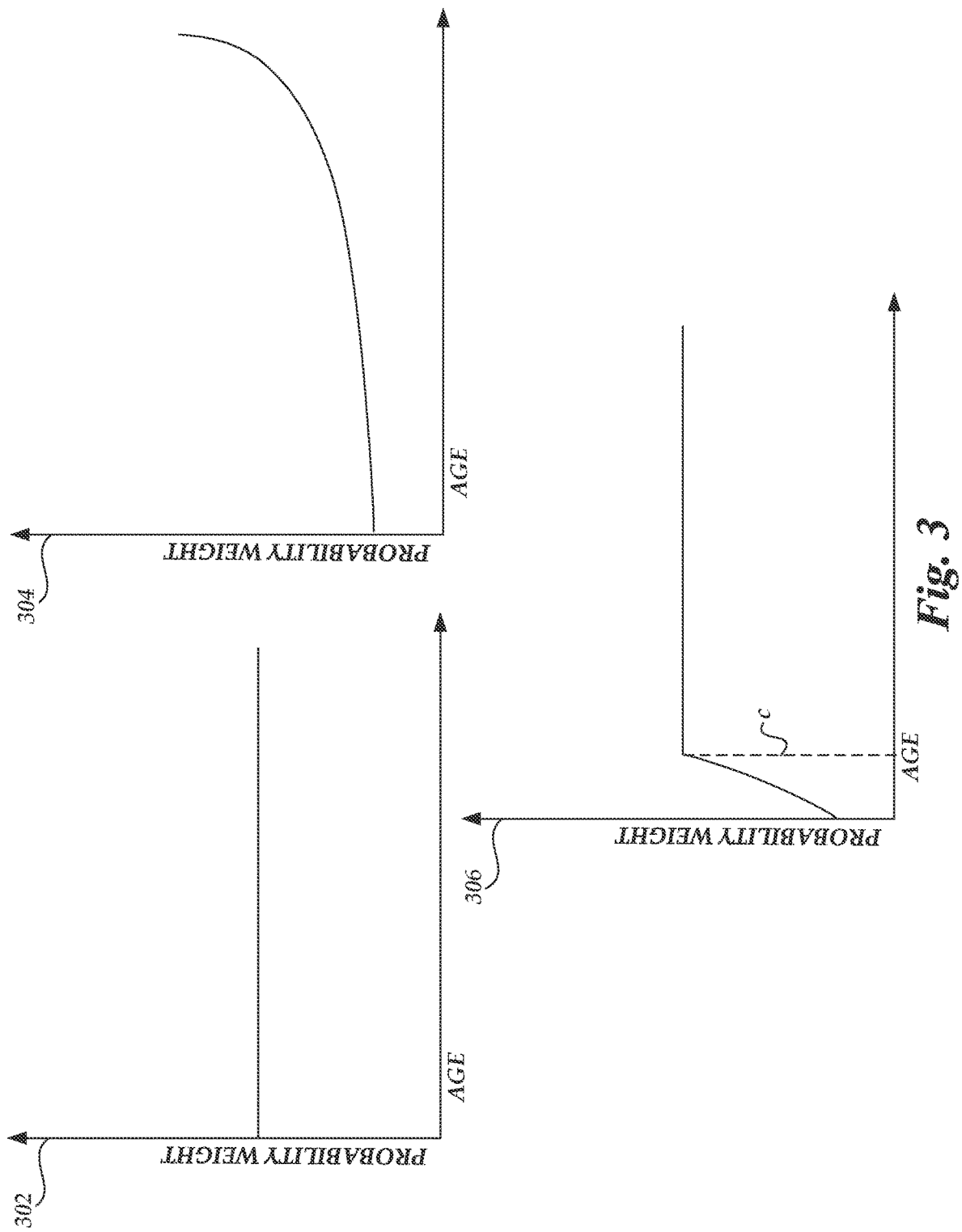
FIG. 3 shows illustrative visualizations of probability density functions that may be used to select servers for potential placement of a workload, including functions that bias against selection of younger servers in accordance with embodiments of the present disclosure.

With reference to FIG. 3, illustrative probability density functions used in accordance with the present disclosure to bias against selection of younger servers within a candidate set will be described. Specifically, FIG. 3 shows three PDFs: a first PDF 302 that lacks bias based on age, a second PDF 304 that biases on age across a lifespan of a server 114, and a third PDF 306 that biases across a portion of that lifespan, such as a first 10% of that lifespan.

As can be seen in FIG. 3, the first PDF 302 is flat, reflecting an equal probability of selecting a server 114 at any age. Use of this PDF to select a candidate set of servers 114 (e.g., a purely random selection among servers 114) can therefore lead to the focus firing problems discussed above. To address this, and alternative PDF can be formed which biases against selection of younger servers 114 within a candidate set of size k.

In one embodiment, a PDF is defined according to the size k, and based on an assumption that among a set k, a younger server 114 will have less load than an older server 114, and thus be selected by a load balancer 112. Under this assumption, if there are around w servers 114 of each age (e.g., as a normalized percentage of a lifespan 1) the probability that an individual server 114 in an age range [t, t+dt] (where t is a normalized percentage of a lifespan) is selected by a load balancer 112 applying a best of k selection is (1/w) times $$kf(t)(1-F(t))^{k-1}dt \qquad (1)$$

where
  $f(t)$ is the desired probability density function,
  $F(t)$ is the corresponding distribution function, such that $F'(t)$, and k is the size of the candidate set.
By setting $y=y(t)=1-F(t)$, equation (1) can be restated as $$-y^{k-1}\frac{dy}{dt}dt \qquad (2)$$

This can in turn be restated in the form of ak dt for some constant a that is independent of t. Accordingly, $$-y^{k-1}dy=a\,dt \qquad (3)$$

which by integration becomes $$\frac{y^k}{k}=b-at \qquad (4)$$

for some constant b. Thus, $$y(t)=1-F(t)=k(b-at))^{1/k} \qquad (5)$$

Note that $F(0)=0$ and $F(1)=1$ due to $F(t)$ representing the distribution function. Thus, $a=b=1/k$ and $$F(t) = 1 - (1-t)^{\frac{1}{k}};  \qquad (6)$$
$$f(t) = F'(t) = \frac{(1-t)^{\frac{1}{k}-1}}{k}$$

Accordingly, the function $f(t)$ shown in equation (6) can be applied as a probability density function, to result in equal distribution of load among server 114 of various ages under the assumption that a younger server 114 will have less load than an older server 114, and thus be selected by a load balancer 112. The graph 304 in FIG. 3 depicts a general form of the function $f(t)$ shown in equation (6). As can be seen in FIG. 3, the relative probability of selection a server 114 of a given age increases as the age of the server 114 increases. Accordingly, the function $f(t)$ shown in equation (6) can be said to be biased against selection of younger servers 114, resulting in reduction or elimination of focus firing for younger servers 114.

In some cases, it may be that the assumption above (that a younger server 114 will have less load than an older server 114, and thus be selected by a load balancer 112) does not hold true for all ages. For example, as shown in FIG. 1, there may be a point within the age of a server 114 that load reaches a relative equilibrium, and focus firing is avoided due to general operation of load balancers 112 to distribute workloads among servers 114. It may thus be undesirable to bias against selection of younger servers when such servers are above a threshold age. Indeed, biasing against that selection may inhibit efficient load balancing.

Accordingly, it may be desirable to set the relative probability of selecting a server of sufficient age c (where c is set, e.g., as a proportion of lifespan) to a constant value, such as one. Accordingly, a PDF can be defined as $$f(t)=f(c) \text{ for all } t \in [c,1] \qquad (7)$$

In determining $F(t)$ and $f(t)$ for $t \in [c, 1]$, note that equations (1) and (2), and thus equations (3) through (5), still hold. Moreover, $F(0)=0$ also holds, and thus $b=1/k$. Accordingly, letting m denote the constant ak, $$\text{for } t \in [0, c], \qquad (8)$$

-continued $$F(t) = 1 - (1-mt)^{1/k} \text{ and}$$

$$f(t) = F'(t) = \left(\frac{m}{k}\right)(1-mt)^{\frac{1}{k}-1}$$

Noting that the total probability mass is 1, m can then calculated as:

$$F(c)+(1-c)f(c)=1 \qquad (9)$$

which is equivalent to $$(1-mc)^{\frac{1}{k}} = \frac{(1-c)m}{k}(1-mc)^{\frac{1}{k}-1} \qquad (10)$$

And $$m = \frac{k}{1-c+kc} \qquad (11)$$

The value of m given by equation (11) can then be substituted into the equations of (8), the result of which can be combined with the equation of (7) to result in a probability density function that biases against selection of a server 114 with age between 0 and c.

The graph 306 in FIG. 3 depicts a general form of the function ƒ(t) calculated according to equations (7), (8), and (11). As can be seen in FIG. 3, the relative probability of selection a server 114 of a given age increases in the range from 0 to c as the age of the server 114 increases, and then is constant in the range of c to 1. Accordingly, this function ƒ(t) can be said to be biased against selection of servers 114 younger than age c, resulting in reduction or elimination of focus firing for younger servers 114.

While example probability density functions are shown in FIG. 3, and number of functions may be used to bias against selection of younger servers. For example, a PDF may be set such that the relative probability of selecting a server increases linearly with age, or increases linearly up to a point c. While the threshold age c is set in the equations above as a relative percentage of lifespan, in other instances the threshold age may be set absolutely (e.g., as a minutes since added to a fleet). Moreover, while PDFs are shown in FIG. 3 that bias against selection of younger servers, embodiments of the present disclosure may additionally or alternatively use a PDF that biases against selection of older works. For example, it may be preferable to "drain" load on older servers prior to an expected end of life. Embodiments of the present disclosure may be used to conduct this drain, by use of a PDF that biases against selection of older servers and thus inhibits routing of loads to those servers. Illustratively, a PDF may be created such that after a threshold age (e.g., 90% of expected lifetime, 95%, etc.), the relative probability of selecting a server decreases according to a given function (e.g., linearly, exponentially, etc.). Thus, embodiments of the present disclosure may utilize such a PDF to effectively drain load from older servers. These techniques for draining load may be used in addition to the techniques for avoiding focus firing noted above, or used independently. Thus, the PDFs of FIG. 3 are illustrative in nature.

Figure 4:
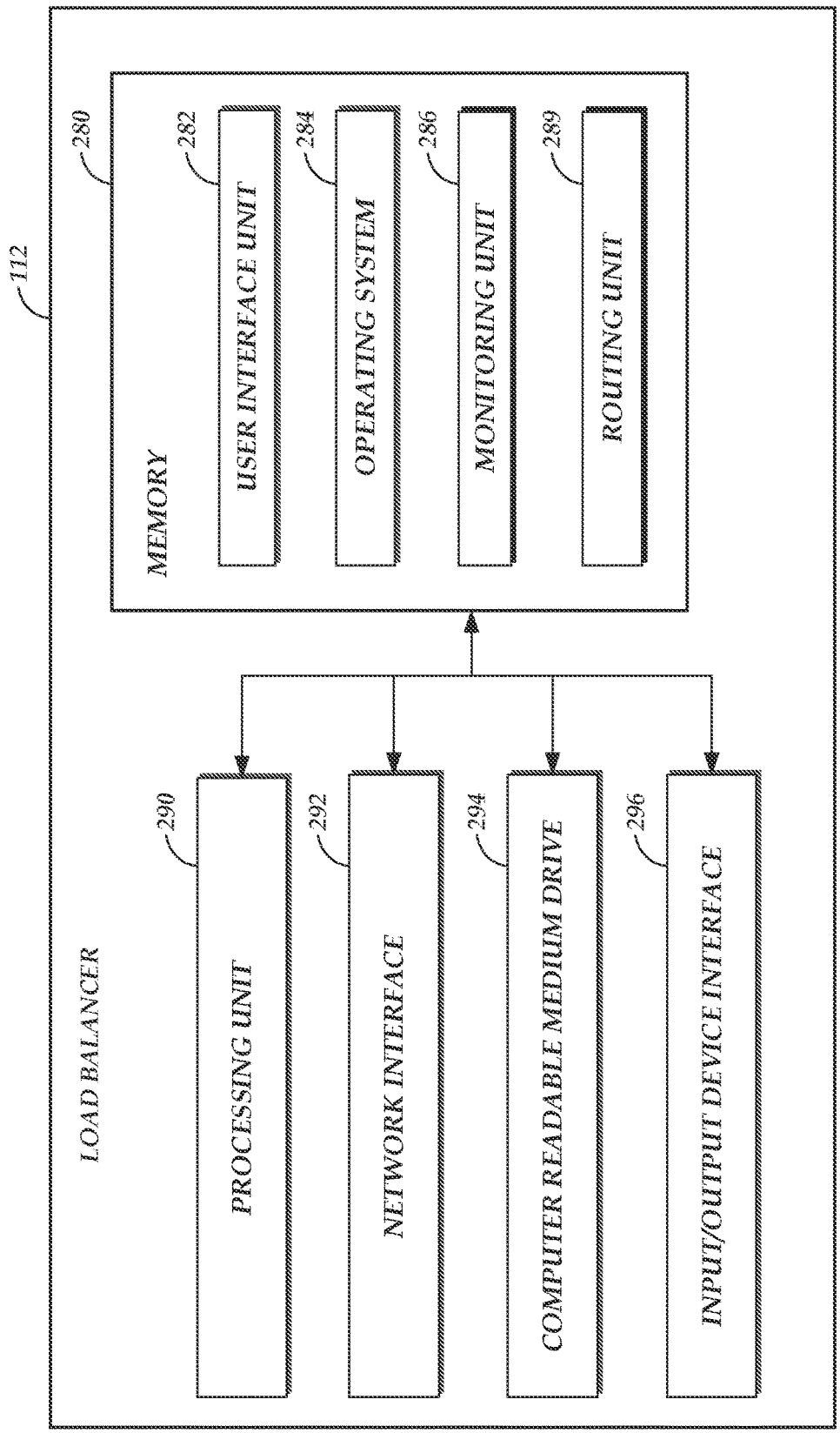
FIG. 4 depicts a general architecture of a computing device providing a load balancer that is configured to route workloads among the set of servers of FIG. 2.

FIG. 4 depicts a general architecture of a computing system (referenced as load balancer 112) that operates to facilitate load balancing of requests between servers of a fleet in accordance with embodiments of the present disclosure. The general architecture of the load balancer 112 depicted in FIG. 4 includes an arrangement of computer hardware and software modules that may be used to implement aspects of the present disclosure. The hardware modules may be implemented with physical electronic devices, as discussed in greater detail below. The load balancer 112 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 2. As illustrated, the load balancer 112 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the balancer 112. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device, and an operating system 284. In addition, the memory 280 may include and/or communicate with one or more data repositories (not shown), for example, to access user program codes and/or libraries.

In addition to and/or in combination with the user interface unit 282 and operating system 284, the memory 280 may include a monitoring unit 286 and routing unit 289 that may be executed by the processing unit 290. In one embodiment, the monitoring unit 286 and routing unit 289 implement various aspects of the present disclosure. For example, the monitoring unit 286 can represent code executable to obtain information for servers 114 within a fleet, such as load on the servers 114 and age of those servers 114. The routing unit 289 can represent code executable to route an individual request according to a best of k algorithm, with k servers 114 being selected according to a probability distribution function that biases at least in part against selection of younger servers 114.

Figure 5:
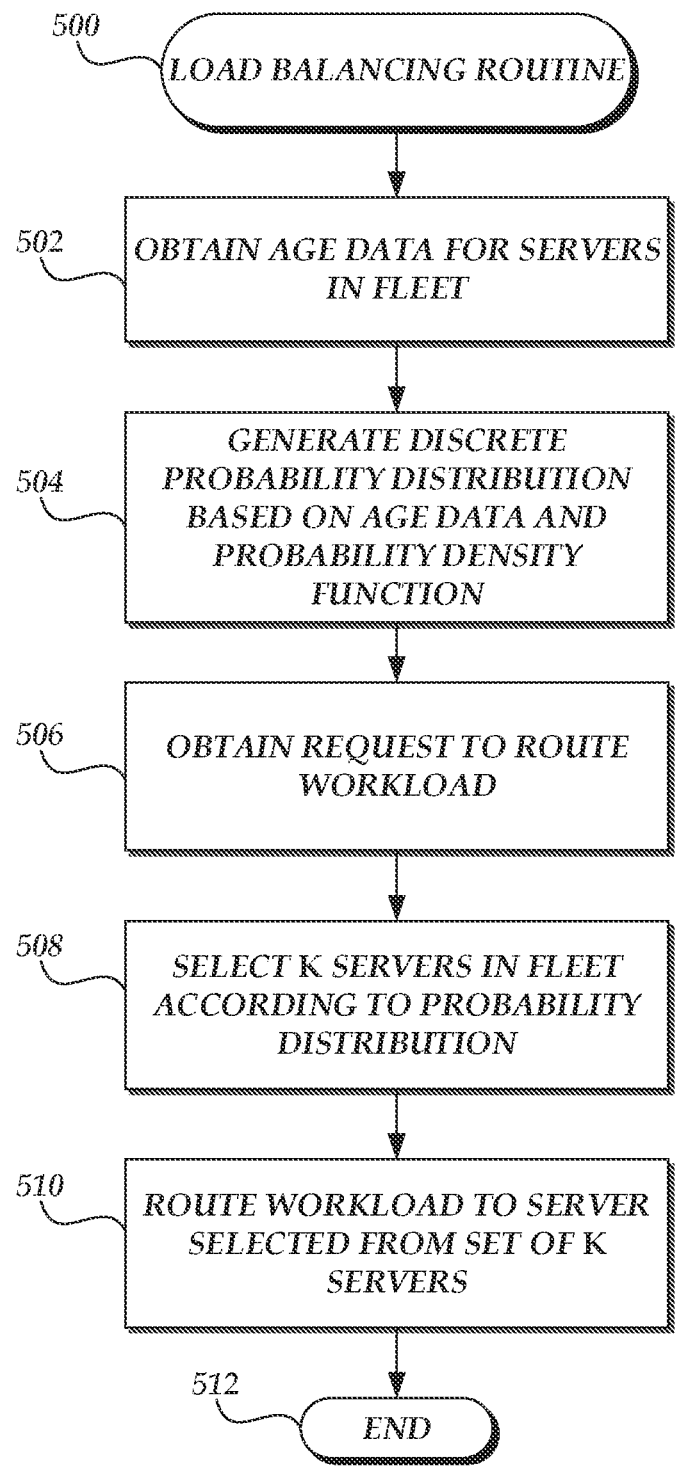
FIG. 5 is a flow chart depicting an illustrative routine for routing workloads in accordance with embodiments of the present disclosure, including use of a probability distribution that biases at least partly against selection of younger servers.

With reference to FIG. 5, an illustrative routine 500 will be described for conducting a "best of k" selection according to a probability distribution that biases at least partly against selection of younger servers 114 within a fleet. The routine 500 can be carried out, for example, by each load balancer 112 of the fleet.

The routine 500 begins at block 502, where the load balancer 112 obtains age data for servers in the fleet. The load balancer 112 may obtain the age data periodically, for example every n minutes (where n may be selected, for example, based on a frequency of change to the set of servers in the fleet). Additionally or alternatively, the load balancer 112 may obtain the data on a change to the composition of the fleet. For example, removal or addition of a server 114 may trigger transmission of a notification to the load balancer 112 of that removal or addition, and appropriate updating of the ages of the servers. In one embodiment, the ages are normalized to a specific range (e.g., between 0 and 1).

At block 504, the load balancer 112 generates a discrete probability distribution based on the age data and a probability density function that biases against selection of younger servers 114. The probability density function may be a function such as that of equation (6), or that of equations (7), (8), and (11). The age data can then be applied to the probability density function (e.g., with the age of a given server 114 representing the time value t) to result in a distribution of relative probabilities for selecting each server 114 in the fleet. That is, the continuous function can be transformed into a discrete distribution. In some embodiments, age data may be first be reduced prior to application of the probability density function. For example, servers may be categorized into a set of age categories (e.g., in increments of a given number of hours or minutes). This distribution may be periodically updated, for example each m minutes. In other embodiments, the distribution may be continuously updated. For example, the routine 500 may be modified such that block 504 occurs subsequent to block 506, discussed below.

At block 506, the load balancer 112 obtains a request to route a workload to the fleet of servers 114. The request may represent, for example, a request to generate a new execution environment on a server 114 to support execution of code on a serverless code execution system.

At block 508, the load balancer 112 selects k servers 114 at random from the fleet according to the generated relative probability distribution. The load balancer 112 then at block 510 routes the workload to a server 114 selected from the set k. Selection from the set k can occur according to any number of load balancing criteria. For example, the load balancer 112 may select a server on the basis of minimal load (expressed in terms of one or more computing resources) or according to a variety of other selection criteria. The load balancer 112 then routes the workload to the server 114, thus balancing load among the servers 114.

As noted above, the relative probability distribution used to guide selection of the set k at block 508 is at least partly biased against selection of young servers 114, such that random selection is less likely to result in selection of young servers 114 within the set k. Accordingly, even if the load balancer 112 applies selection criteria that would result in focus firing on a younger server 114, this effect is reduced or eliminated by the reduced selection of young servers 114 within the set k. As a result, the routine 500 improves load balancing relative to other mechanisms for random selection of k servers (e.g., according to a flat probability distribution function).

One skilled in the art will appreciate that while shown as a single routine, the routine 500 in practice may be implemented as separate routines. For example, blocks 502 and 504 may occur as one or more distinct routines with their own periodicity, while blocks 506 and 510 may be repeated for each workload to be routed. Thus, the combination and ordering of blocks shown in FIG. 5 is illustrative in nature.

Moreover, the routine 500 may in some embodiments be modified or combined with other functionalities. Illustratively, where a fleet or servers 114 contains more than a single configuration of computing resources (e.g., each representing a sub-fleet), a sub-fleet routing routine may be implemented prior to the routine 500, which routine selects an appropriate sub-fleet to which to route a workload. An example sub-fleet routing routine is disclosed in U.S. Pat. No. 11,470,015 (the "'015 Patent"), entitled "ALLOCATING WORKLOADS TO HETEROGENOUS WORKER FLEETS" and filed concurrently with the present application, the entirety of which is hereby incorporated by reference. For example, a request routing device as disclosed in the '015 Patent may be implemented prior to a load balancer 112 of the present disclosure. As another example, operation of the load balancer 112 can be further improved by implementation of routine to route workloads based on correlations or anti-correlations with existing workloads on a server 114, such as by biasing selection of k servers 114 to avoid selection of servers 114 with existing workloads that are correlated to a workload being routed, and to prefer selection of servers 114 with existing workloads that are anti-correlated to the workload being routed. An example of such a routine is disclosed in U.S. patent application Ser. No. 17/208,959 (the "'959 Application"), entitled "EFFICIENT ALLOCATION OF WORKLOADS BASED ON CORRELATED WORKLOAD CLUSTERS" and filed concurrently with the present application, the entirety of which is hereby incorporated by reference. For example, a load balancer 112 may implement a combined routine combining routine 500 with the routine 600 of the '959 Application, such as by modifying blocks 608 and 610 of the routine 600 of the '959 Application such that selection occurs according to a biased probability distribution, as disclosed herein. Still further, in some embodiments the routine 500 may be modified to use a PDF that biases against selection of older servers. As described above, application of such a PDF can enable a load balancer to effectively drain load from older servers, preparing those servers for retirement. Where the PDF biases against selection of both younger and older servers, this draining may be achieved in conjunction with avoidance of focus firing. Where the PDF biases against selection of older servers without biasing against selection of younger servers, the modified routine 500 can be then be repurposed to facilitate draining of servers in a number of environments, including those that might not incur focus firing. Thus, the routine 500 is intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a fleet of server computing devices configured to implement workloads on behalf of client computing devices, wherein individual server computing devices are associated with ages reflecting their relative time within the fleet; and
   one or more load balancer devices configured to:
      obtain age data reflecting the ages of the individual server computing devices;
      generate a relative probability distribution based on application of the age data to a probability density function, wherein the probability density function reflects relative probabilities to randomly select a server computing device from the fleet, wherein the relative probabilities are determined at least in part as a function of age of the individual server computing devices, and wherein the relative probabilities bias against selection of younger server computing devices relative to older server computing devices;
      obtain a request to route a workload to the fleet;
      select a plurality of server computing devices at random from the fleet according to the relative probability distribution;
      identify a least loaded server computing device from the plurality of server computing devices; and
      route the workload to the least loaded server computing device selected from the plurality of server computing devices.

2. The system of claim 1, wherein the fleet of servers is associated with a serverless computing system, and wherein the workload is creation of an execution environment supporting execution of code on the serverless computing system.

3. The system of claim 1, wherein load on the server computing devices is a measurement of at least one of processor time, memory, bandwidth, or programmatic resources.

4. The system of claim 1, wherein individual server computing devices within the fleet are periodically retired and replaced with new server computing devices.

5. A computer-implemented method comprising:
   obtaining age data reflecting ages of individual server computing devices within a fleet of server computing devices configured to implement workloads on behalf of client computing devices;
   generating a relative probability distribution based on application of the age data to a probability density function, wherein the probability density function reflects relative probabilities to randomly select a server computing device from the fleet, wherein the relative probabilities are determined at least in part as a function of age of the individual server computing devices, and wherein the relative probabilities bias against selection of younger server computing devices relative to older server computing devices;
   obtaining a request to route a workload to the fleet;
   selecting a plurality of server computing devices at random from the fleet according to the relative probability distribution; and
   routing the workload to a server computing device selected from the plurality of server computing devices.

6. The computer-implemented method of claim 5, wherein the server computing device is selected from the plurality of server computing device as a least loaded server computing device among the plurality.

7. The computer-implemented method of claim 5, wherein ages are substantially equally distributed among the fleet.

8. The computer-implemented method of claim 5, wherein the relative probabilities bias against selection of server computing devices younger than a threshold age relative to server computing devices older than the threshold age.

9. The computer-implemented method of claim 8, wherein the threshold age is at least one of a percentage of a maximum expected server age or an absolute age.

10. The computer-implemented method of claim 5, wherein the relative probabilities are defined according to the equations $$\text{for } t \in [c, 1], f(t) = f(c)$$

$$\text{for } t \in [0, c], f(t) = \left(\frac{m}{k}\right)(1 - mt)^{\frac{1}{k}-1}$$

where $$m = \frac{k}{1 - c + kc}$$

k is the number of server computing devices within the plurality of server computing devices; and c is a threshold age below which the relative probabilities bias against selection.

11. The computer-implemented method of claim 5, wherein the relative probabilities increase at least partly linearly with age of the server computing devices.

12. The computer-implemented method of claim 5 further comprising:
   obtaining a notification that a new server computing device has been added to the fleet;
   updating the age data to reflect addition of the new server computing device; and
   regenerating a relative probability distribution according to the updated age data.

13. The computer-implemented method of claim 5 further comprising:
   periodically updating the age data according to a duration of time that has passed; and
   regenerating a relative probability distribution according to the updated age data.

14. One or more non-transitory computer-readable media comprising computer executable instructions that, when executed by a computing system including a fleet of servers, cause the computing system to:
   obtain age data reflecting ages of individual servers within the fleet;
   generate a relative probability distribution based on application of the age data to a probability density function, wherein the probability density function reflects relative probabilities to randomly select a server from the fleet, wherein the relative probabilities are determined at least in part as a function of age of the individual servers, and wherein the relative probabilities bias against selection of younger servers relative to older servers;
   obtain a request to route a workload;
   select a plurality of servers at random from the fleet according to the relative probability distribution; and
   route the workload to a server selected from the plurality of servers.

15. The one or more non-transitory computer-readable media of claim 14, wherein the server is selected from the plurality of servers as a least loaded server computing device among the plurality.

16. The one or more non-transitory computer-readable media of claim 14, wherein the relative probabilities bias against selection of server computing devices younger than a threshold age relative to server computing devices older than the threshold age.

17. The one or more non-transitory computer-readable media of claim 16, wherein the threshold age is a first threshold age, wherein the relative probabilities further bias against selection of server computing devices older than a second threshold age relative to server computing devices younger than the second threshold age, and wherein the second threshold age is older than the first threshold age.

18. The one or more non-transitory computer-readable media of claim 14, wherein the executable instructions further cause the computing system to:
   obtain a notification that a new server computing device has been added to the fleet;
   update the age data to reflect addition of the new server computing device; and
   regenerate a relative probability distribution according to the updated age data.

19. The one or more non-transitory computer-readable media of claim 14, wherein the executable instructions further cause the computing system to:
   periodically update the age data according to a duration of time that has passed; and
   regenerate a relative probability distribution according to the updated age data.

20. The one or more non-transitory computer-readable media of claim 14, wherein the instructions are executed at a load balancer device configured to route requests to the fleet.

21. The one or more non-transitory computer-readable media of claim 14, wherein the instructions are executed at multiple load balancer devices configured to operate in parallel to independently route requests to the fleet.

\* \* \* \* \*